No. 802,064. PATENTED OCT. 17, 1905.
A. J. ALLISON.
PLATFORM TREADLE FOR HAND CARS.
APPLICATION FILED JULY 6, 1905.
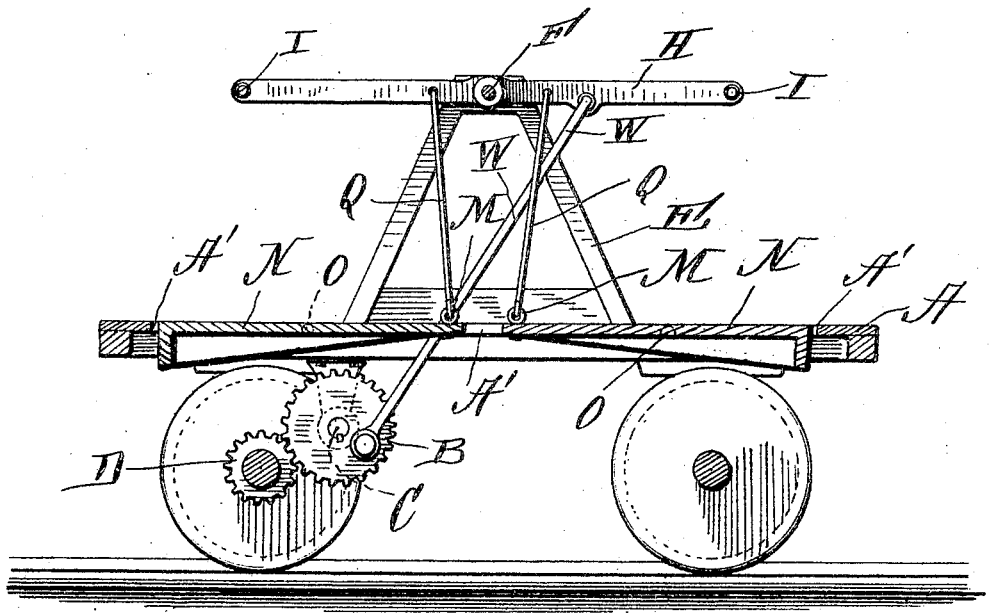
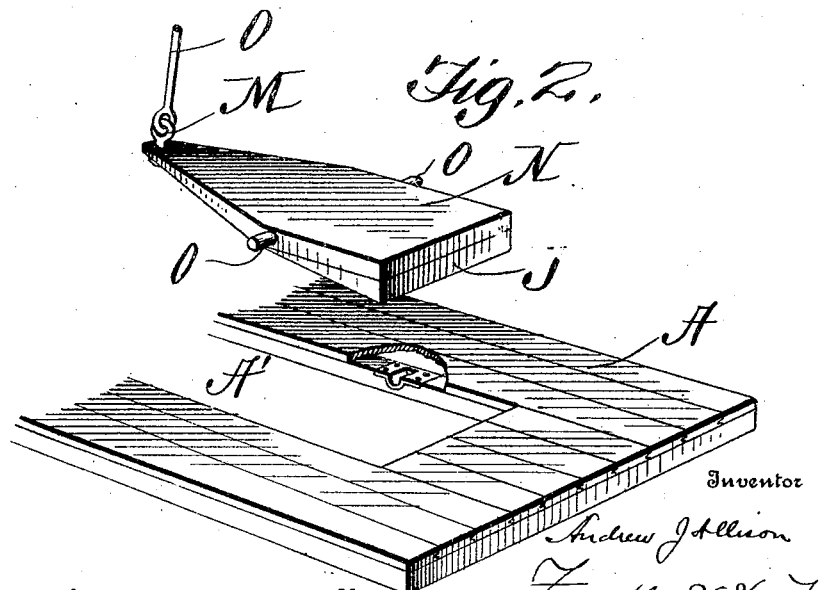

UNITED STATES PATENT OFFICE.

ANDREW J. ALLISON, OF TYLER, TEXAS.

PLATFORM-TREADLE FOR HAND-CARS.

No. 802,064.　　　　Specification of Letters Patent.　　　　Patented Oct. 17, 1905.

Application filed July 6, 1905. Serial No. 268,430.

*To all whom it may concern:*

Be it known that I, ANDREW J. ALLISON, a citizen of the United States, residing at Tyler, in the county of Smith and State of Texas, have invented certain new and useful Improvements in Platform-Treadles for Hand-Cars; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in combined platform, treadle, and hand-lever power mechanism for driving cars and other machinery; and the object of the invention is to produce a simple and efficient apparatus whereby the weight of a body may be utilized by means of a treadle to assist hand-lever mechanism and comprises various details of construction, combinations, and arrangements of parts, which will be hereinafter fully described and then specifically defined in the appended claim.

My invention is illustrated in the accompanying drawings, in which—

Figure 1 is a vertical sectional view through a hand-car, showing my apparatus as applied thereto; and Fig. 2 is a sectional view through one of the treadles.

Reference now being had to the details of the drawings by letter, A designates the platform of a car, having a truck and a recessed portion A' in the flooring thereof, and said truck is mounted upon suitable axle-wheels, as shown. A gear-wheel B is fixed to a shaft C and is in mesh with a second gear-wheel D, mounted to rotate with a rear axle of the truck. Rising from the platform of the truck is a standard or bridle E, which supports on a pivotal pin F a tilting bar H and which has a rod I fastened to its end, forming a means whereby said bar may be tilted upon its pivot.

Q designates rods which are connected at their upper ends to the bar H, one upon each side of the pivot-pin F, and N N designate treadles, which are mounted upon pivotal pins O in the flooring of the truck, and their forward ends are tapering and carry eyes M, to which the lower ends of the rods Q are connected. Each of said treadles has a flanged portion J about its opposite and outer edges, affording means to prevent accidents incident to operator's feet or other obstructions coming underneath the treadles.

A rod W is fastened at its upper end to the bar H, and its lower end is pivotally connected to a crank-arm upon the shaft carrying the gear-wheel B, whereby as the bar H is rocked upon its pivot-pin a rotary movement may be imparted to the wheels of the truck in the manner shown and described.

In operation it will be noted that the operator in raising up upon the rod 1 at the end of the handle-bar H may rest his weight upon the rear end of the treadle, which will assist in forcing one end of the bar upward, while the party at the opposite end of the bar H may depress upon a suitable rod Q and in so doing rest his weight upon the floor upon one side of the treadle, and by this alternate movement first upon one side and then the other it will be noted that the weight of the body and the downward pressure caused by the upward lift will be utilized in coöperating with the hand-lever to drive the car.

While I have shown my apparatus as applied to a hand-car, it will be understood that the same may be utilized for various power purposes, such as pumping, &c., without in any way departing from the spirit of the invention.

Having thus fully described my invention, what I claim as new, and desire to secure by Letters Patent, is—

In combination with a car-truck with a platform having an opening therein, standards rising from said platform, a rock-shaft journaled in suitable bearings in said standards, a walking-beam fixed to said shaft, tilting treadles, pins projecting therefrom and journaled in suitable sockets along the marginal edges of said opening, rods pivotally connecting the inner ends of each of said treadles, with said walking-beam at positions upon either side of its central pivotal portion, a gear-wheel, a rod pivotally connected eccentrically to said gear-wheel and having connection with said walking-beam, and gear connections between said wheel and the shaft of the truck, as set forth.

In testimony whereof I hereunto affix my signature in the presence of two witnesses.

ANDREW J. ALLISON.

Witnesses:
J. C. BRADBERRY,
J. W. GLENN.